(12) United States Patent
Ene et al.

(10) Patent No.: US 11,328,332 B2
(45) Date of Patent: May 10, 2022

(54) METHODS AND SYSTEMS FOR REFERRER-BASED PAYMENT SYSTEM SELECTION FOR INTERNET-BASED MERCHANTS

(71) Applicant: LaterPay AG, Steinhausen (CH)

(72) Inventors: Cosmin-Gabriel Ene, Munich (DE); Martin Hans, Bad Salzdetfurth (DE)

(73) Assignee: LaterPay AG, Steinhausen (CH)

( * ) Notice: Subject to any disclaimer, the term of this patent is extended or adjusted under 35 U.S.C. 154(b) by 0 days.

(21) Appl. No.: 16/628,534

(22) PCT Filed: Jul. 6, 2018

(86) PCT No.: PCT/EP2018/068423
§ 371 (c)(1),
(2) Date: Jan. 3, 2020

(87) PCT Pub. No.: WO2019/008160
PCT Pub. Date: Jan. 10, 2019

(65) Prior Publication Data
US 2020/0184436 A1    Jun. 11, 2020

Related U.S. Application Data

(60) Provisional application No. 62/529,157, filed on Jul. 6, 2017.

(51) Int. Cl.
*G06Q 30/06* (2012.01)
*G06Q 20/08* (2012.01)
(Continued)

(52) U.S. Cl.
CPC ..... *G06Q 30/0601* (2013.01); *G06Q 20/0855* (2013.01); *G06Q 20/1235* (2013.01);
(Continued)

(58) Field of Classification Search
CPC .............. G06Q 30/0601; G06Q 30/06; G06Q 30/0619; G06Q 30/0637; G06Q 20/1235; G06Q 20/0855; G06Q 20/405
(Continued)

(56) References Cited

U.S. PATENT DOCUMENTS

2005/0171842 A1* 8/2005 Tien ................... G06Q 30/0214
705/14.16
2006/0036582 A1* 2/2006 Sondergaard ......... G06F 16/951
(Continued)

FOREIGN PATENT DOCUMENTS

JP         2010086308 A  *  4/2010  ............. G06F 17/21

*Primary Examiner* — Yogesh C Garg (57) ABSTRACT

A method for an internet-accessible content provider computer server that, in response to receiving request information from a referred user device for access to specific digital content subject to a fee, the server: (a) selects a particular payment system based on referrer information included in request information transmitted, (b) transmits to the selected payment system information indicative of the requested specific digital content and a request for approval of the user device for the corresponding fee for the digital content, (c) facilitating communication between the selected payment system and the user device, (d) based on receiving from the selected payment system an approval signal, transmitting the requested specific digital content to the user device.

14 Claims, 6 Drawing Sheets

(51) Int. Cl.
*G06Q 20/12* (2012.01)
*G06Q 20/40* (2012.01)

(52) U.S. Cl.
CPC ....... *G06Q 20/405* (2013.01); *G06Q 30/0619* (2013.01); *G06Q 30/0637* (2013.01)

(58) Field of Classification Search
USPC ............................................ 705/26.1, 26.44
See application file for complete search history.

(56) References Cited

U.S. PATENT DOCUMENTS

| | | | |
|---|---|---|---|
| 2009/0234730 A1* | 9/2009 | Lee .................... | G06Q 30/0277 705/14.73 |
| 2010/0332488 A1* | 12/2010 | Horvitz .................. | G06F 16/41 707/759 |
| 2011/0178868 A1* | 7/2011 | Garg ................. | G06Q 30/0251 705/14.45 |
| 2012/0066056 A1* | 3/2012 | Meehan ............. | G06Q 30/0247 705/14.46 |
| 2013/0227709 A1* | 8/2013 | Herbert .................. | G06F 21/10 726/28 |
| 2014/0283108 A1* | 9/2014 | Torgerson ............... | G06F 21/10 726/27 |
| 2017/0249507 A1* | 8/2017 | King .................... | G06K 7/1404 |
| 2018/0144366 A1* | 5/2018 | Kramer ............. | G06Q 30/0273 |

* cited by examiner

METHODS AND SYSTEMS FOR REFERRER-BASED PAYMENT SYSTEM SELECTION FOR INTERNET-BASED MERCHANTS

This application is a National Stage Application of PCT/EP2018/068423 filed Jul. 6, 2018, which claims priority from U.S. Patent Application No. 62/529,157 filed Jul. 6, 2017. Each of the prior mentioned applications is hereby incorporated by reference herein in its entirety.

FIELD OF THE INVENTION

This disclosure pertains to methods and systems useable by merchants for selecting payment systems for use with internet-based transactions.

BACKGROUND

The exceedingly large amount of content on the internet can only be exploited by normal users by means of internet-based search services. These systems in general generate an index of a part of the content of the internet and allow users to search this index for keywords or combinations thereof. The index is often generated using so-called search bots or spiders, i.e., software programs that cause internet-connected computers to load, analyze and index web-content. Various ways exist for internet-based merchants or content providers to influence the operation of search bots for loading relevant content, skipping content that content owners do not want to be indexed, and to ensure a fair distribution of the search resources between merchants. In particular, merchants can flag content that is not to be indexed or searchable.

Similarly, means exist for merchants to make content available to search bots that is actually not available for users without payment of a fee. These merchants often implement a pay-wall before the content can be accessed by a user that is referred to such content by an internet-based search service. In such instances, the search bots for the search service may access the full content, but users have to pay before they can access such content. However, such an arrangement creates problems of many users being annoyed if internet search results refer them to content that they actually cannot see or use, unless they accept to register to the pay service and accept the respective purchase amount to be paid immediately. The article of the online magazine "SearchEngine Land", available at http://searchengineland.com/time-for-google-to-rank-paid-news-content-better-220918, and hereby incorporated herein in its entirety, describes this problem in greater detail and various conventional techniques that attempt to overcome this problem.

One technique described in this article is for merchants to allow indexing of generally payed-for content and then allow users to access such content for free for one or a limited number of content items, when such user is referred to such content from a particular internet search service. This technique is based on the hope of the merchants that users will be subsequently interested in accessing more content from the same merchants and will be willing to pay a fee for accessing such further content. This technique is further described in greater detail in U.S. Pat. No. 9,043,942, which is incorporated herein in its entirety.

However, the disadvantages of this and similar techniques include that (a) despite the hopes of the merchants, users may not accept having to pay for its further content, and (b) a reduction in potential income for merchants occurs due to lost revenue for the free access by users to content referred to by respective search engines. Moreover, in order to build or maintain its popularity with users and in order to avoid annoying such users confronted with paywalls, an internet-based search service provider may pressure merchants to offer free access to content for users that are referred by such search service provider.

Such disadvantages are compounded for both merchants and users due to operations of conventional payment systems. Specifically, internet-based merchants often request a new user to register with their name and email address. During the shopping process, the postal address for shipping non-digital goods and credit card information is requested before a purchase is finally accepted by merchants. For digital content such as e-books, articles, images, audio or video, the process is very much the same without the shipping postal address. Alternatives to providing a credit card are various other types of bank accounts. Another alternative is to transfer money to the merchants via, for example, a virtual currency, such as bitcoin.

Other existing payment systems offer a payment service to internet-based merchants and users which have benefits over the above-described registration methods. Some services include registration only at the payment service, such as the service offered by PayPal Holdings, Inc. These services require only an email address to be provided to the merchants. The merchants then requests settlement of a bill from the payment service and based on the mail address and the customer's registration, the payment service communicates with the customer and finalizes the purchase. These and other payment service require as prerequisite that not only an agreement to pay before the purchase is finalized, but in many systems payment must be received for the purchase to be is finalized. For digital content this means, the credit card is debited or the payment service transfers the purchase amount to the Internet-based merchants before the digital content is transmitted to the customer.

Accordingly, known techniques fail to provide a means that serves both the interests of the merchants and the users. For merchants, their interest is to request and receive payment for providing access to valuable content from users who are referred to such content by referrer services, such as internet-based search services, and for users, their interest is to be provided easy access to referred content, i.e., without the hassle of registration or login, or making payment before access is granted to such content.

SUMMARY

By way of example, aspects of the present disclosure solve the above-described problems created by conventional internet shopping platforms and payment systems. Specifically, the present disclosure is directed to a content provider computer server that, in response to receiving request information from a referred user device for access to specific digital content subject to a fee, the server: (a) selects a particular payment system based on referrer information included in request information, (b) transmits to the selected payment system information indicative of the requested digital content and a request for approval of the user device for the corresponding fee for the digital content, (c) facilitating communication between the selected payment system and the user device, and (d) based on receiving from the selected payment system an approval signal, transmitting the requested specific digital content to the user device. The computer-implemented method described in this disclosure advantageously exploits the ability of referring entities to include information in a referring website link, i.e., URL address, which indicates the source of the referral.

The methods of the present disclosure are particularly advantageous when used with easy-access payment systems, e.g., payment systems that do not require identification of the user, registration or login to the payment system or content provider computer by a user associated with the user device. Such an improved payment process is described in, for example, European patent application publication no. EP2476087, which is owned by the assignee of this patent application, and which such process: (a) stores an identification number of the user device; (b) stores the purchase amount in relation to the identification number; (c) monitors the total amount of purchases by the user device; (d) receives a request from the Internet-based merchant to account for the purchase amount; and (e) sends a request for settlement of at least a part of the total amount of purchases to a user of the user device only when the total amount of purchases exceeds a predefined value and/or after the expiry of a predefined time interval.

Such combination enables a user to make internet-based purchases using a user device for a purchase amount for which the buyer does not initially have to settle. Information regarding purchases and purchase amounts are maintained by the payment system in relation to a user device identification, which does not include an identification of the user, nor does it need a registration, login or little other user interaction.

Accordingly, the computer-implemented disclosure advantageously solves the problem created by internet-based commerce by providing a method that serves both the interests of the content provider and the user in that a payment can be requested by the content provider for all valuable content and users of referrer service, such as internet-based search services, will be able to conveniently pay or agree to pay a corresponding fee relative to other referrers or direct access, without registration or login, identifying the user or delaying a user's access to the content.

Another aspect of the present disclosure is the content provider computer determining whether the identified referrer, who referred the user device to the content, satisfies an easy-access criterion and if so, selects an easy-access payment system.

A further aspect of the invention is the use of an easy-access payment system in instances when (a) the identified referrer provided an internet search service to the user device, (b) the paid content was provided by the content provider to the identified referrer for indexing and/or for making it available to an internet search service, and (c) the identified referrer and the content provider have an agreement for such easy access.

Another related aspect of the present disclosure is the content provider computer server providing information to the payment system; wherein the information based on the identified referrer causes the payment system to not to request settlement from the user of the user device prior to receiving the requested content by, for example, increasing the predetermined threshold for the total amount of purchases used by the payment system to determine whether to request settlement from the user or otherwise delaying the request for payment.

Another aspect of the present disclosure is the content provider computer providing the paid content based on approval from a payment system, wherein the user device identification is amended based on the identified referrer of the content causing the payment system to account the fee for the content on an account that is specific for combination of the user device and the referrer.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect." The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Figure 1:
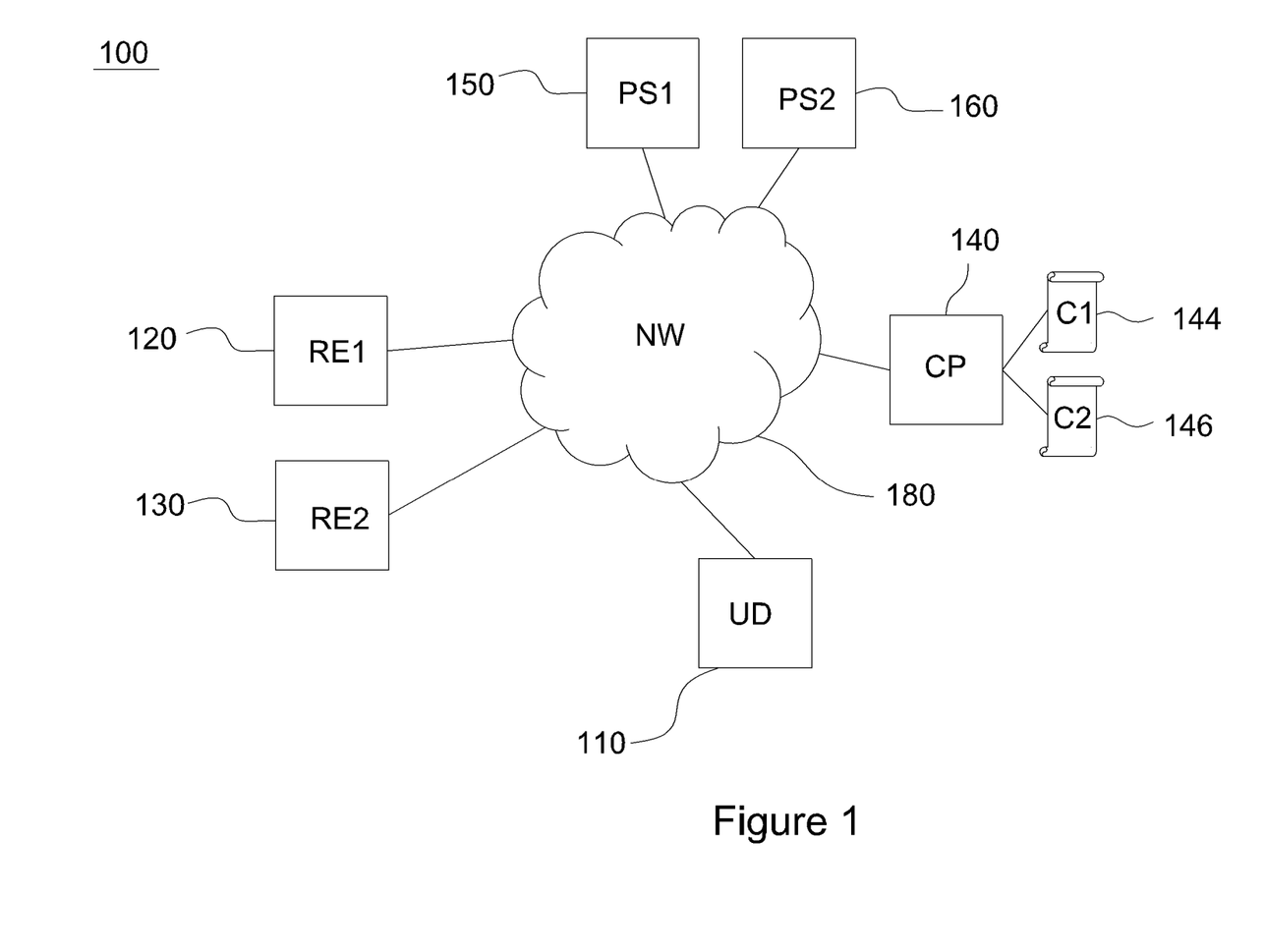
FIG. 1 is a schematic diagram showing an exemplary data network for a digital content computer server according to aspects of the present disclosure.

In accordance with aspects of the present disclosure, FIG. 1 depicts an exemplary system network 100 for distributing digital content to internet-accessible user devices according to aspects of the present disclosure. The system network 100 includes an internet-accessible network 180 accessible by a user device 110, two referrer systems 120 and 130, an internet-based merchant system 140 (alternatively referred to herein as "content provider computer server" or "content provider"), and two payment systems 150 and 160. The content provider 140 offers access to digital content items 144 and 146.

The user device 110 may, for example, be a personal computer, or a mobile processing device, e.g. a mobile phone or tablet. As used herein, "referrer" refers to any system or network of systems that refer a user and/or a user device to the network address of content offered by a content provider. The referrers 120 and 130 may be single servers or groups of servers for, search service providers. The referrers may be systems each comprising many single entities interconnected via the network 180 or via other networks. The referrers 120, 130 may comprise computer devices, storage devices, data base devices and the like so that the referrers each are a multitude of entities providing a referral service to the user device 110 and potentially other devices.

The payment systems 150 and 160 may comprise, for example, one or more server computer servers interconnected via the network 180 or other networks, which provide the payment service related to this disclosure.

The content provider 140 may be a single server entity controlling access to the content item(s) 144 and/or 146 and managing the content distribution, or a group of server entities, e.g. server computers and storage systems connected through a network, which together provide access to and manage distribution of the content items 144 and/or 146.

The digital content items 144 and 146 may comprise any type of digital data including, for example, pictures, photos, text, video-data, audio-data, speech-audio-data, drawings, maps, plans, construction plan, software and operating instructions, which may be accessible by one or more user devices, such as the user device 110. The digital content items 144 and/or 146 may be accessed by a user device in the form of the content provider 140 transmitting such content as a download, or in a streaming manner. The digital content item(s) 144 and/or 146 may also be in the form of a service, which, in full or in part, may be executed by the content provider 140 and the results 144 and/146 being transmitted to the user device 110, e.g., as may result from a software-as-a-service (SaaS) offering by the content provider 140.

For the present disclosure, the content items 144 and 146 are offered by the content provider 140 for a fee payable by the user 110. The content provider 110 may implement a paywall to restrict access to the content item(s) 144 and/or 146 to users that provide payment for such access. Such paywall may operate, for example, with a payment system. An exemplary suitable payment system may receive from the content provider 140, a billing request that may contain information about the user device 110, the corresponding user, the content item 144 or 146 requested by the user device 110 and/or the associated fee. Such payment system may request from the user device 110, login or registration of the user of the user device 110 and it may request acceptance of the fee or payment of the fee via credit card or other payment means. The payment system may then approve the payment or the agreement to pay by transmitting an approval signal to the content provider 140 who then delivers the requested content item 144 or 146 to the user device 110. It should be readily understood that the payment system may alternatively be operated in the same computer server(s) as the content provider process for providing access to the content items 144 and 146.

An exemplary payment system useable with a paywall that is particularly useful with the systems and methods of the present disclosure is an easy-access payment system. As used herein, an easy-access payment system is payment system that, for example, does not require registration or login by the user or user device, identify the user, or, in some or all instances, overly delay transmission of the content to a user. An exemplary easy-access payment system particularly suitable with the systems and methods of the present disclosure is described in European patent application publication no. EP2476087, which is hereby incorporated by reference herein in its entirety and which is owned by the assignee of this patent application. Such easy-access payment system stores: (a) an identification number of the user device; (b) stores the purchase amount in relation to the identification number, (c) monitors the total amount of purchases of the user device; (d) receives a request from the internet-based content provider to account for the purchase amount; and (e) sends a request for settlement of at least a part of the total amount of purchases to a user of the user device only when the total amount of purchases exceeds a predefined value and/or after the expiry of a predefined time interval.

The content provider 140 may implement or communicate with such an easy-access payment system for the payment system 150 or 160. In such an embodiment, the content provider 140 may alternatively implement the functions of such a payment system so that the content provider 140 itself implements the easy-access payment operations. The content provider 140 may involve one of more types of payment systems having different payment and settlement methods. For example, the payment systems 150 may be an easy-access payment system, while the other payment system 160 may be a legacy payment system requesting a user to login for payment.

In operation of the system network 100 of FIG. 1, a user may use her/his user device 110 may use a search service provider to search for content by keywords or other search criteria or algorithms. The results of such a search may be presented on a displayed webpage in the user device 110 including, for example, URL addresses or web-links referring to relevant search results, including URL addresses for accessing the content item(s) 144 and/or 146 offered by the content provider 140. Alternatively, the user device 110 may be referred to the content provider 110 by other referrer resources than search result webpages.

As a basis of this disclosure, it is assumed that an entity or entities in the network 180 refer the user device 110 to the content provider 140 and to a specific content item 144 or 146 managed by the content provider 140. FIG. 1 depicts two referrers 150 and 160 that may be any system or systems able to provide references, e.g., referring URL addresses, to the contents 144, 146 of the content provider 140. For example, the referrer 150 may be a system of the content provider itself, e.g. a web-server of the content provider referring to the content in a table of contents, while the referrer 160 is a third party search service not under the content provider's control.

Figure 2:
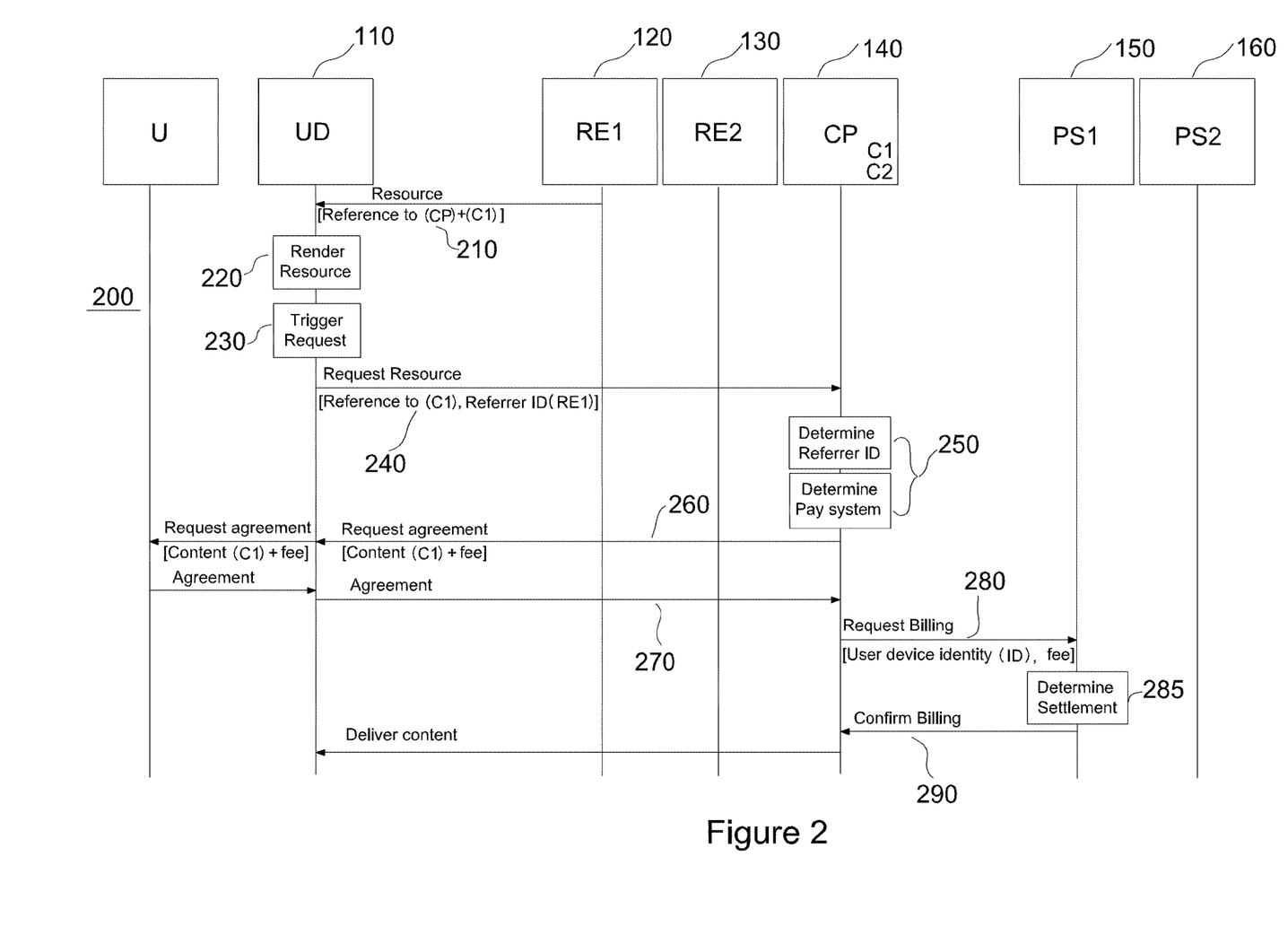
FIG. 2 is a diagram illustrating exemplary operations of the content computer server depicted in FIG. 1.

FIG. 2 depicts a method 200 of a communications flow of the system network 100 implementing particular aspects of this invention. In step 210, the user device 110 receives resource information from a referrer 120. The resource information may be a web-page or an XML-file for rendering, in step 220, information on a display of the user device 110. The resource information may contain a reference to the content provider 140 and the content item 144, e.g., in form of a web-link or an address in the internet. The resource information may be rendered, e.g., displayed, on the user device 110, so that the user, in step 230, can activate the reference, i.e. click on the link or otherwise trigger a request for the referenced content. An activation of the referral link may also be done without user interaction, e.g. autonomously or as a result of applying pre-defined rules by an application or the operating system of the user device 110. In step 240, the request for the content item 144 is transmitted from the user device 110 to the content provider 140. The request comprises a referrer identity ("Referrer ID") of the referrer 150.

Then, in step 250, the content provider 140 determines, based on the referrer identity Referrer ID which payment system to apply for the content item 144 requested by the user device 110. The determination may in addition be based on other criteria, e.g. the individual user device 110 or the device type, the specific content item 144 or the content type.

The determination may consider information, for example, which is not depicted including, for example, in instances where the referrer is a search service provider system. In such instances, the search service provider system regularly requests and/or receives content information from the content provider 140 for indexing and providing the index information of the content to the search service, i.e. make the content searchable by users of the service. The content provider performed step 250 for determining a payment system may be based on whether the referrer identification Referrer ID matches an identification of a search service provider system that received the full digital content item 144. The content provider 140 could thus select a specific payment system if the referrer identity Referrer ID indicates referral from such search service. The relation between provisioning of content to a referral system and determining a payment service based on a comparison of the referral system and the received referrer identity Referrer ID is described in greater detail with regard to FIG. 4.

In an alternative example, the content provider 140 may include payment system 150 and 160 offering multiple kinds of payment methods, e.g., payment system 150 offering an easy-access payment and payment system 160 offering a legacy access payment system. In step 250, the referrer identity Referrer ID may influence the payment system 150 or 160 to be selected. For explanatory purposes only, the payment system 150 will be considered an easy-access payment system. As a consequence, the content provider 140, in step 260, may request payment or confirm an agreement to later receive payment of the fee for the request for content by the user device 110 based on the determined easy-access payment system. The fee may be determined, in whole or in part, based on the referrer identity Referrer ID or be, for example, a fixed amount for all payment systems or an amount fixed for certain payment system, but different for other payment systems. The request is transmitted from the content provider 140 to the user device 110 which may render the request via its user interface to the user.

In response to the user transmitting back to the content provider 140 a signal indicating her/his agreement in step 270, the content provider 140 may request billing from a payment system 150 in step 280. The billing request may include triggering an establishment of a connection between the user device 110 and the payment system 150. The payment system 150 identifies the user device 110 or parts thereof via the connection. The content provider 140 may further identify the user device or a part of the user device in a user device identity (ID) and provide this user device identity (ID) to the payment system in a billing request.

The establishment of a connection between the user device 110 and the payment system 150 and/or the user device identification and provision of the user device identity (ID) to the payment system 150 may alternatively be performed by the content provider 140 as a result of the determining, for example, that the payment system 150 is an easy-access payment system. The billing request may also comprise the fee for the requested content item 144 and a description of the content requested. The payment system 150 may receive the billing request from the content provider 140 and store the fee in relation to the user device identity (ID).

If the payment system 150 is an easy-access payment system, it will, in step 285, monitor a total sum of billing requests related to the user device identity (ID) that have not been settled and compares this sum with a preset threshold amount. If the sum exceeds the threshold amount, the payment system 150 will trigger a request for settlement of at least a part of the total sum from the user associated with the user device 110, otherwise no further user interaction occurs for the exemplary transaction for the content item 144 (as depicted in FIG. 2). The payment system 150, in step 290, confirms by transmitting an approval signal to the content provider 140, who in turn, in step 295, transmits the content item 144 to the user device 110.

Figure 3:
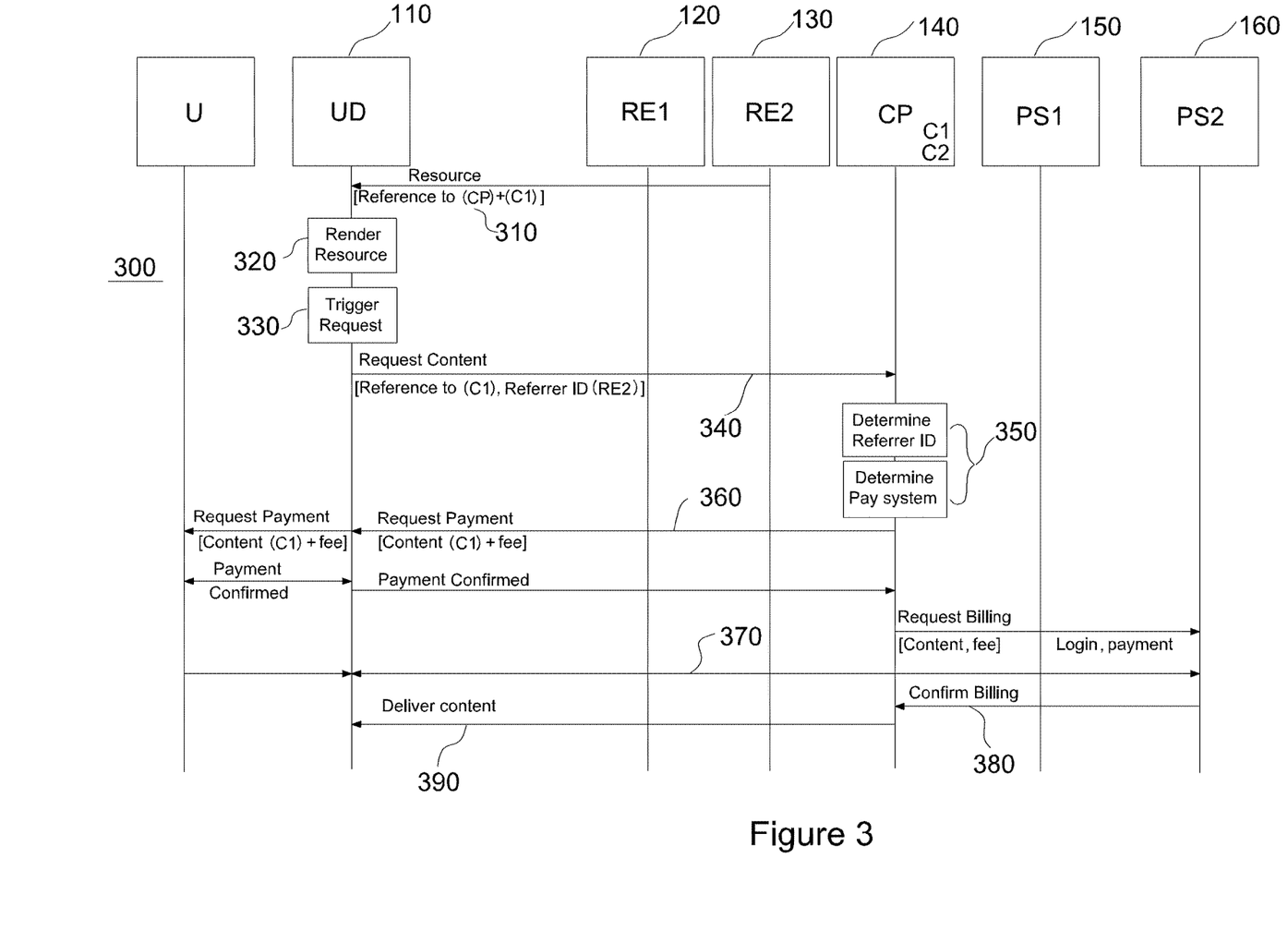
FIG. 3 is a diagram illustrating exemplary operations of a content computer server that is an alternative to the operations depicted in FIG. 3.

FIG. 3 depicts an alternative method 300 of a communications flow for the system network 100 implementing particular aspects of this invention. The steps and sequence of method 300 are similar to the method 200 depicted in FIG. 2, with certain differences. Specifically, in step 310 of the method 300, the user device 110 receives resource information comprising a referral to the content item 144 from referrer 160, which is rendered on the user device 110 in step 320, which triggers a request for the content item 144 from the content provider 140 in steps 330 and 340, in an identical or substantially similar manner as steps 210-240 in FIG. 2. In response, the content provider 140 determines the referrer identity Referrer ID and selects the corresponding payment system in step 350 in a similar manner as step 250 of FIG. 2. However, in FIG. 3, this selection step selects payment service 160 (instead of 150 as in FIG. 2). In this example, the payment system 160 is a conventional payment system and not an easy-access payment system.

Accordingly, the payment system 160, in step 360, may require a registration and/or login of the user of the user device 110 to arrange for payment. The particular method for such registration and login is not critical to the present disclosure and may be accomplished using conventional well-known payment systems methods. After payment has been made is step 370, and confirmed by the payment system 160 to the content provider 140 in step 380, the content provider 140 transmits the requested digital content to the user device 110 in step 390.

Figure 4:
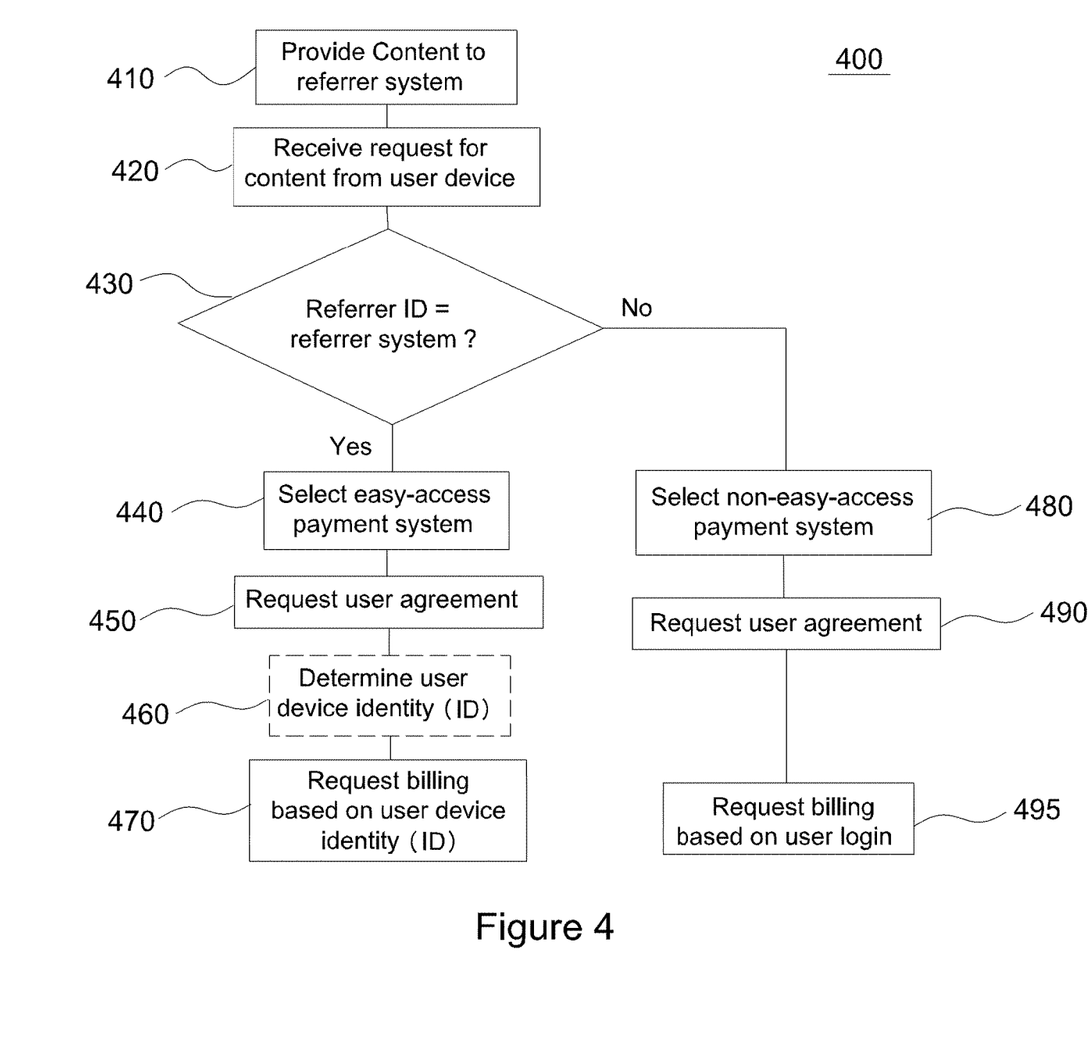
FIG. 4 is a flowchart of an exemplary method performed by a content provider computer server in accordance with aspects of the present disclosure.

FIG. 4 depicts a flowchart of an exemplary method 400 that may be performed by the content provider computer server 140 for implementing aspects of the present disclosure. The method 400 starts in step 410, wherein such content provider 140 provides, for example, content item 144 to a referral system, such as referrer system 120. The content item 144 is provided to the referrer system 120 for the purpose to generate references to the content and thus direct users to such content. The referrer system 120 may, for example, be an internet-based search service or any other service that generates references to the content received from the content provider 140.

Then, at a later time, the content provider 140 may receive a request from a user device, such as user device 110, in step 420, for access to the content or parts thereof. The request comprises a referrer identity Referrer ID that informs the content provider 140 about which referrer system 120 or 130 referred the user device 110 to the content. The referrer system 120 or 130 may be the content provider itself, i.e. a link on the content provider's web-site referenced the content, or it may be from a third party system. In the step 430, the content provider 140 determines, whether the Referrer ID indicates that the user device 110 was referred to the content by the referrer system 120 that received the content in step 410, and if so, the content provider 140 selects, for example, an easy-access payment system in step 440. At such time, the content provider 140 may also determine a fee for the content based, at least in part, on the Referrer ID.

Then, in step 450, the user's confirmation to pay the fee is requested for the content and a user device identity (ID) may optionally be determined, shown in FIG. 4 with dashed lines because the step of determining the user device identity (ID) may performed alternatively by the payment system 150 or 160. Further, in step 460, billing of the fee for the content is requested from the easy-access payment system based on the user device identity (ID) that has been determined by the content provider 140 or that is determined by the easy access payment system.

However, if in step 430, the Referrer ID does not indicate the referrer system 120 as the origin of the referral, another payment system may be selected by the content provider 140 in step 480. As indicated in step 480, the selected other payment system may not be an easy-access payment system and thus it may be based on user registration and login. The content provider may then, in step 490, request the user's confirmation for payment of the fee and further, in step 495, request immediate billing of the user for the fee from the selected payment system.

Figure 5:
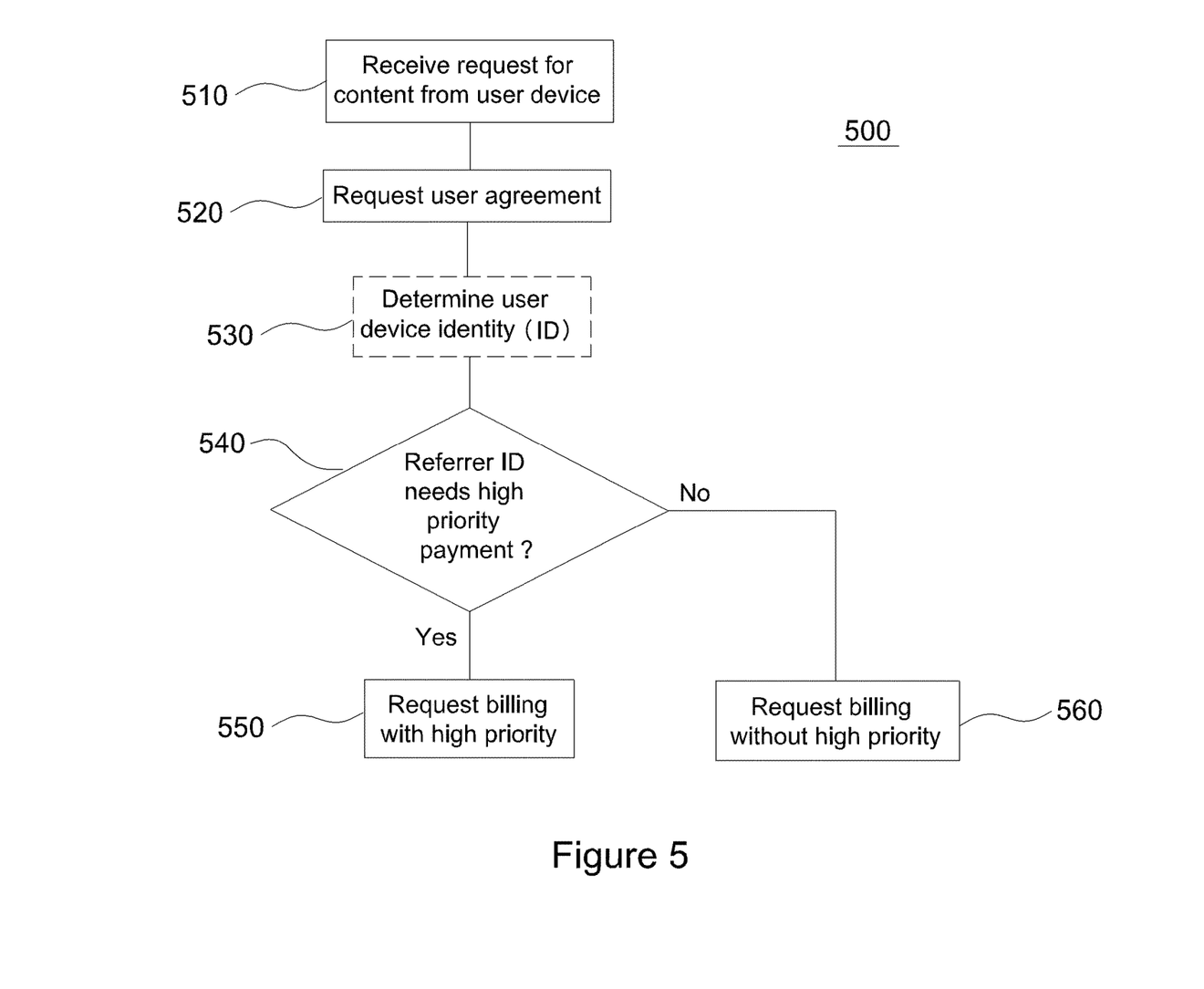
FIG. 5 depicts a flowchart of another exemplary method performed by a content provider computer server implementing other aspects of the present disclosure.

FIG. 5 depicts a flowchart of another exemplary method 500 that may be performed by the content provider computer server 140 for implementing other aspects of the present disclosure. In this embodiment, the content provider 140 selects an easy-access payment system for payment of a fee for content with at least one feature of the easy-access payment being determined based on the Referrer ID. Specifically, in step 510, the content provider 140 receives a request for the content item 144 from a user device, such as user device 110. The request comprises a referrer identity Referrer ID that informs the content provider about which referrer system referred the user device 110 to the content item 144. In step 520, the user's confirmation for payment of the fee is requested for the content item 144 and a user device identity (ID) may be determined by the content provider (shown with dashed lines) as step 530, or alternatively at a later point in time by the payment system.

Then, in step 540, the content provider 140 determines if the Referrer ID indicates a high priority payment treatment is requested. As used herein, a high priority payment may be a payment that guarantees an easy-access payment without the requirement for user. If, in step 540, it is determined that a high priority payment treatment is requested, the method 500 proceeds to step 550, and a bill is transmitted to the payment system without further interaction from the user and the requested content item 144 is transmitted to the user device 110. However, if in step 540, it is determined that the Referrer ID does not indicate a high priority payment treatment is required, the method 500 proceeds to step 560 and billing and payment is requested from the payment system before transmission of the content item 144 to the user device 110 occurs. The triggering of the high priority treatment in FIG. 5 may also comprise temporarily increasing the threshold applied by an easy-access payment system to determine whether to request settlement from the user. As a consequence, it is less likely that settlement would be sought by the easy-access payment system prior to transmission of the content item 144.

In the alternative, the Referrer ID may include a status of the user or the user device 110 instead of or in addition to an indicator that high priority payment treatment is required. Such status of the user or user device 110 may be used by the content provider 140 for selection of the payment system 150 or 160, or determination of the fee for the requested digital content.

Figure 6:
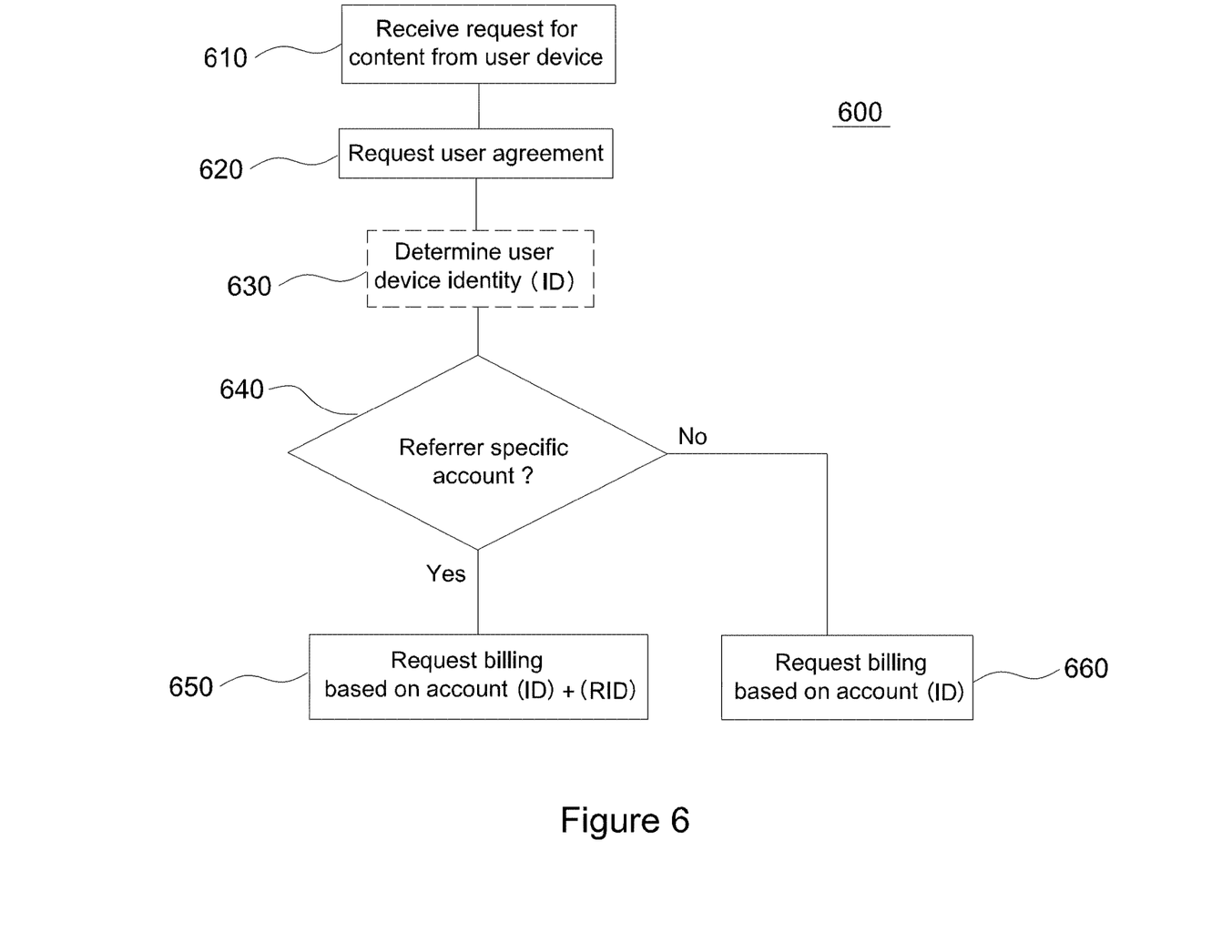
FIG. 6 depicts a flowchart of yet another exemplary method performed by a content provider computer server implementing other aspects of the present disclosure.

FIG. 6 depicts a flowchart of yet another method 600 that may be performed by the content provider computer server 140 according to further aspects of the present disclosure. According to the method 600, the content provider 140 selects an easy-access payment system for payment of a foe for content with at least one aspect of the easy-access payment being determined based on the Referrer ID, requested use of a referrer-specific account. In particular, in step 610, the content provider 140 receives a request for content item 144 from the user device 110. The request comprises a referrer identity Referrer ID that informs the content provider 140 which referral system 120 or 130 referred the user device 110 to the content item 144. In step 620, the user's confirmation for payment of the fee is requested for the content item 144. The user device identity (ID) may be determined by the content provider (shown with dashed lines) as step 630, or alternatively at a later point in time by the payment system.

The content provider 140 then determines, in step 640, whether the Referrer ID identifies a referrer which requires billings to a referrer-specific account for the user device in contrast to an account that is only user device specific. As an example, a specific referrer could request the content provider 140 to apply an easy-access payment system with an account that only has to be settled by the user if the sum of purchases of content accessed based on a referrals by the same referrer exceeds a threshold amount. Accordingly, the content provider 140 determines, in step 640, whether a referrer-specific account needs to be applied and if so, it enhances the user device identity (ID) determined by a referrer specific enhancement (RID). Based on the identity (ID) or (ID)+(RID), billing is requested from the payment system in step 650. However, if in step 640, it is determined that it is not necessary to provide billing to a referrer specific account for the user device 110, the method 600 proceeds to step 660, wherein billing is made to an account that is specific for the user device 110.

REFERENCE CHARACTER TABLE

The following table lists the reference characters and names of features and elements used herein: Reference characters assigned to method steps are not listed.

| Ref. char. | Feature or element |
| --- | --- |
| 100 | System network |
| 110 | User device |
| 120 | Referral system 1 |
| 130 | Referral system 2 |
| 140 | Content provider |
| 144 | Digital content 1 |
| 146 | Digital content 2 |
| 150 | Payment system 1 |
| 160 | Payment system 2 |
| 180 | Internet-accessible network |

It will be understood that, while various aspects of the present disclosure have been illustrated and described by way of example, the invention claimed herein is not limited thereto, but may be otherwise variously embodied within the scope of the following claims.

The invention claimed is:

1. A method for delivering digital content, implemented by a digital content computer server, comprising the steps of:
   a. receiving, over a network, request information from a user device for transmission of digital content to said user device, said digital content transmission subject to a fee, said request information provided to the user device by a referrer system in response to the referrer system receiving a search request from the user device, the request information including digital content information indicative of the requested digital content and referrer system identification information indicative of the identity of the referrer system;
   b. identifying the referrer system from the request information, wherein the identified referrer system is a search service provider system that received the requested digital content from the digital content computer server in advance of receiving the search request from the user device, and indexed the received digital content to be identified in response to the search request;
   c. selecting, a preferred payment system to account for the fee, wherein the preferred payment system is selected based on information accessible to the server that associates the preferred payment system with the identified referrer system, and wherein the preferred payment system is configured to provide an approval signal to the digital content computer server for transmitting the requested digital content to the user device without receiving a user registration or login, and/or without receiving a payment of the fee;
   d. transmitting to the selected payment system, information indicative of the user device and the requested digital content, and a request for approval to transmit the requested digital content to the user device; and
   e. receiving the approval signal from the selected payment system and transmitting the requested digital content to said user device.

2. The method of claim 1 wherein the approval signal is generated without identifying a user associated with the user device.

3. The method of claim 1 further comprising the step of determining the fee based at least in part on the identified referrer.

4. The method of claim 1 wherein the step of transmitting the specific digital content to said user device occurs based on the approval signal without receipt of payment for the fee.

5. The method of claim 1, wherein the step of transmitting a request for approval comprises transmitting information requesting the payment system to account for the fee for the user device without requesting payment of the fee from the user of the user device for the approval.

6. The method of claim 5, wherein the step of transmitting a request for the payment system to account for the fee for the user device without requesting payment of the fee is initiated based on the received information indicative of a referrer.

7. The method of claim 1 wherein the information indicative of a referrer further includes information indicative of a status of a user associated with the user device.

8. The method of claim 7 further comprising the step of determining the fee based at least in part on the status of the user.

9. The method of claim 1 wherein the selecting step further comprises the steps of:
   a. Identifying at least two payment systems;
   b. transmitting to the user device information regarding the identified payment systems and a request for selection of one of the payment systems; and
   c. receiving from the user device a selection information signal indicative of the selected payment system of the one of the identified payment systems.

10. The method of claim 1, wherein the step of transmitting a request for approval comprises transmitting information requesting the payment system base such approval for a referrer-specific account for the user device.

11. The method of claim 1, wherein the step of transmitting a request for approval comprises transmitting information requesting the payment system base such approval for a referrer-specific account for a user associated with the user device.

12. The method of claim 1 further comprising the steps of:
[a.] receiving a follow-up request from the payment system; and [b.] transmitting to the user device information indicative of the follow-up request and link to a payment system server.

13. The method of claim 1, wherein the request information comprises a uniform resource locator (URL).

14. The method of claim 1, wherein the request information is contained in a hyperlink.

* * * * *